(No Model.)

J. B. OLIVER & H. CREHAN.
GRIP NUT.

No. 569,659. Patented Oct. 20, 1896.

WITNESSES

INVENTORS

UNITED STATES PATENT OFFICE.

JAMES B. OLIVER, OF SHIELDS, AND HUBERT CREHAN, OF PITTSBURG, PENNSYLVANIA, ASSIGNORS TO THE OLIVER IRON AND STEEL COMPANY, OF PITTSBURG, PENNSYLVANIA.

GRIP-NUT.

SPECIFICATION forming part of Letters Patent No. 569,659, dated October 20, 1896.

Application filed January 13, 1896. Serial No. 575,235. (No model.)

*To all whom it may concern:*

Be it known that we, JAMES B. OLIVER, of Shields Station, and HUBERT CREHAN, of Pittsburg, in the county of Allegheny, State of Pennsylvania, have invented a new and useful Improvement in Grip-Nuts, of which the following is a full, clear, and exact description, reference being had to the accompanying drawings, forming part of this specification, in which—

Figure 1:
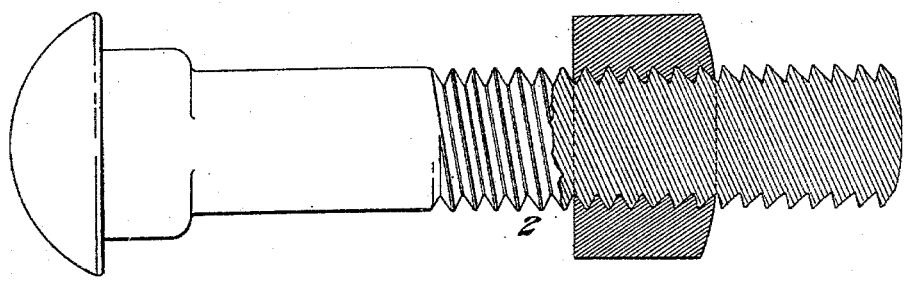
Figure 2:
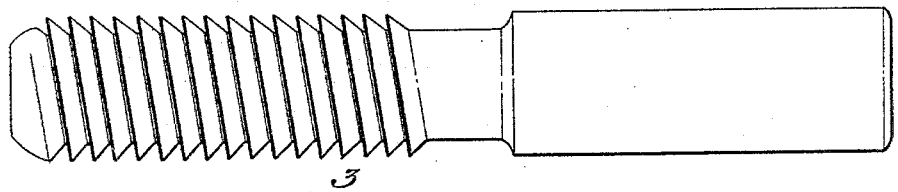

Figure 1 is a longitudinal sectional view of a bolt and nut constructed in accordance with our invention, and Fig. 2 is a side elevation of the bending-plug we employ.

Our invention relates to that class of grip-nuts wherein the threads upon the nut and bolt are varied relatively to each other in such manner that the nut will bind itself in place upon the bolt. Heretofore a common method of accomplishing this result consisted in cutting the threads upon the nut with an angle different from that of the threads upon the bolt, the pitch or number of threads to the inch being the same upon both. The effect of this changing of the angle was that when the nut was jammed against the fish-plate or other object the outer parts of the bolt-teeth engaged by the nut were set backwardly. With such construction, however, when the nut is unscrewed all its threads become changed to the same angle as those upon the bolt and the nut cannot be used again as a grip-nut. Our invention overcomes this objection, and is designed to provide a nut which will lock itself in any position upon the bolt independently of any jamming against the object, is locked against movement in either direction along the bolt, and when unscrewed can be employed again upon the same or a similar bolt with the same effective gripping action as before.

In carrying out our invention we form a bolt and nut in the usual manner with the standard V-threads thereon, as shown at 2 in Fig. 1, the threads upon the nut having exactly the same pitch as those upon the bolt. We then run into the nut the steel plug 3 of Fig. 2, which is provided with threads having the same pitch as, but of a different angle from, those upon the nut. This plug is moved into the nut a sufficient distance to bend part of the threads therein into ratchet-threads, having a different angle from the remainder of the threads, these bent threads being the outer threads of the nut. The plug is then withdrawn and the bolt and nut are ready for use.

The action of the nut is as follows: The first threads of the nut which engage those of the bolt being the same size and pitch, the nut moves easily thereon up to the ratchet-threads in the nut, after which it is forced on to the desired point by a wrench. As the nut moves over the bolt its ratchet-threads bend the threads of the bolt over which they move into similar ratchet form, and in any position upon the bolt it is locked from movement in either direction, since to move backward the V-threads upon the nut must bend the bent ratchet-threads upon the bolt back to their original V shape, while to move forward the ratchet-threads of the nut must bend the succeeding threads of the bolt into ratchet form. Movement in either direction, therefore, can only be effected by a force applied to the nut. When the nut is unscrewed from the bolt, the bolt-threads are all bent back into V form, the bolt and nut resume their original relative shape, and the gripping action will be had when they are used again, exactly the same as before.

The advantages of the invention will be apparent to those skilled in the art, since with little or no additional expense an ordinary nut is converted into a grip-nut, which will bind upon the bolt and prevent its movement in either direction, while it may be reused with the same or another similar bolt any number of times with the same effective grip action as when first used.

Many variations may be made in the exact form of the bolt, the nut, and their threads without departing from our invention, since

What we claim as new, and desire to secure by Letters Patent, is—

1. A nut, the bodies of a portion of whose threads extend at a different angle from the bodies of the remaining threads; substantially as described.

2. A nut, having a portion of its threads of V shape, and the remainder of ratchet form, substantially as described.

3. The combination with a bolt, of a nut, the bodies of a portion of whose threads extend at the same angle as those of the bolt, while the bodies of the remaining nut-threads extend at a different angle therefrom; substantially as described.

4. The combination with a bolt having V-threads, of a nut having a portion of its threads of V shape, while the remainder are bent into ratchet form; substantially as described.

5. The combination with a bolt, of a nut, the bodies of the inner threads of which extend at the same angle as those of the bolt, while the bodies of the outer threads are bent to a different angle; substantially as described.

6. A nut, the opposite sides of a portion of whose threads extend at the same angle while the one side of the remaining threads extends at a different angle from that of the opposite side; substantially as described.

In testimony whereof we have hereunto set our hands.

JAMES B. OLIVER.
HUBERT CREHAN.

Witnesses:
STEPHEN W. TENER,
JOHN C. SMITH.